(12) United States Patent
Kato et al.

(10) Patent No.: US 11,313,705 B2
(45) Date of Patent: Apr. 26, 2022

(54) VEHICLE BODY FRONT STRUCTURE

(71) Applicant: HONDA MOTOR CO., LTD., Tokyo (JP)

(72) Inventors: Yasuyuki Kato, Wako (JP); Daisuke Naoi, Wako (JP)

(73) Assignee: HONDA MOTOR CO. LTD., Tokyo (JP)

(*) Notice: Subject to any disclaimer, the term of this patent is extended or adjusted under 35 U.S.C. 154(b) by 686 days.

(21) Appl. No.: 16/358,824

(22) Filed: Mar. 20, 2019

(65) Prior Publication Data

US 2019/0293460 A1 Sep. 26, 2019

(30) Foreign Application Priority Data

Mar. 23, 2018 (JP) .............................. JP2018-057107

(51) Int. Cl.
 *G01D 11/30* (2006.01)
 *B60R 19/24* (2006.01)
 (Continued)

(52) U.S. Cl.
 CPC .............. *G01D 11/30* (2013.01); *B60R 19/24* (2013.01); *B60R 19/483* (2013.01);
 (Continued)

(58) Field of Classification Search
 CPC ....... G01D 11/30; B60R 19/24; B60R 19/483; B60R 2019/1886; B62D 21/152;
 (Continued)

(56) References Cited

U.S. PATENT DOCUMENTS 7,552,898 B2 * 6/2009 Demange .............. B60R 19/483
  248/27.3
10,598,523 B2 * 3/2020 Alves ..................... G01D 11/30
(Continued)

FOREIGN PATENT DOCUMENTS

CN 102627090 A 8/2012
CN 105599813 A 5/2016
(Continued)

OTHER PUBLICATIONS

Office Action received in corresponding CN application No. 201910227281.7 dated Apr. 23, 2021 with English translation (12 pages).

*Primary Examiner* — Keith J Frisby
(74) *Attorney, Agent, or Firm* — Rankin, Hill & Clark LLP (57) ABSTRACT

A vehicle body front structure has: an object detection device disposed in a vehicle front end section of a vehicle to detect an object ahead of the vehicle; and a pair of bracket members which are spaced apart from each other in a vehicle width direction and which support the object detection device. Each of the pair of bracket members includes: a forwardly extending portion that extends forward from a vehicle body member; and a downwardly extending portion that extends downward from the forwardly extending portion and supports the object detection device. The vehicle body front structure further has a bracket member locking member which couples the forwardly extending portions to each other in the vehicle width direction and to which an exterior member of the vehicle is attached.

6 Claims, 8 Drawing Sheets

(51) Int. Cl.
*B62D 21/15* (2006.01)
*G01S 13/931* (2020.01)
*B62D 27/02* (2006.01)
*B60R 19/48* (2006.01)
*G01S 15/931* (2020.01)
*B60R 19/18* (2006.01)

(52) U.S. Cl.
CPC ............ *B62D 21/152* (2013.01); *B62D 27/02* (2013.01); *G01S 13/931* (2013.01); *B60R 2019/1886* (2013.01); *G01S 2013/93271* (2020.01); *G01S 2013/93275* (2020.01); *G01S 2015/938* (2013.01)

(58) Field of Classification Search
CPC ...... B62D 21/15; B62D 27/02; B62D 25/085; B62D 25/08; G01S 13/931; G01S 2013/93271; G01S 2013/93275; G01S 2015/938; G01S 2015/937; G01S 15/931
USPC .......................... 180/271; 296/193.09, 193.1
See application file for complete search history.

(56) References Cited

U.S. PATENT DOCUMENTS

| | | |
|---|---|---|
| 2002/0125383 A1 | 9/2002 | Takahashi |
| 2007/0063133 A1 | 3/2007 | Furuya |
| 2012/0200121 A1 | 8/2012 | Wuerfel |
| 2016/0137230 A1 | 5/2016 | Taneda |
| 2017/0297521 A1 | 10/2017 | Sugie et al. |
| 2018/0236958 A1* | 8/2018 | Horiuchi ................ B60R 19/02 |
| 2018/0301795 A1* | 10/2018 | Lopez, Jr. ................ H01Q 3/04 |
| 2019/0161041 A1* | 5/2019 | Fernandez ............ B60R 19/023 |
| 2019/0198986 A1* | 6/2019 | Singh ................... H01Q 1/3283 |

FOREIGN PATENT DOCUMENTS

| | | | | |
|---|---|---|---|---|
| FR | 3014404 A1 * | 6/2015 | ............ | B60R 11/00 |
| JP | 2007030535 A * | 2/2007 | | |
| JP | 2007-085751 A | 4/2007 | | |
| JP | 2015063196 A * | 4/2015 | | |
| JP | 2016132276 A * | 7/2016 | | |
| JP | 2018039335 A * | 3/2018 | | |
| KR | 20130098814 A * | 9/2013 | | |
| WO | WO-2016193635 A1 * | 12/2016 | ............ | B60R 11/00 |

\* cited by examiner

VEHICLE BODY FRONT STRUCTURE

CROSS-REFERENCE TO RELATED APPLICATIONS

The present application claims priority under 35 U.S.C. § 119 to Japanese Patent Application No. 2018-057107, filed on Mar. 23, 2018, the contents of which are hereby incorporated by reference in its entirety.

BACKGROUND OF THE INVENTION

1. Technical Field

The present invention relates to a vehicle body front structure and particularly relates to a vehicle body front structure provided with an object detection device in a vehicle front end section.

2. Background Art

As a vehicle body front structure in which an object detection device is attached to a vehicle front end section of a vehicle to detect an object ahead of the vehicle, there is known an object detection device attachment structure described in Japanese Patent Laid Open No. 2007-85751. In the object detection device attachment structure described in Japanese Patent Laid Open No. 2007-85751 (see FIGS. 1 to 4), two pipe brackets, which hold a millimeter wave radar device from lateral sides thereof, are attached to and between an upper frame and a lower frame of a bulkhead in a vertical direction.

An object detection device, such as a millimeter wave radar device, needs to be disposed at a front end portion of a vehicle for the sake of detecting an object ahead of the vehicle.

SUMMARY OF THE INVENTION

Problem to be Solved by Invention

The length of the bulkhead along the vehicle front-rear direction depends on the design of the vehicle. Accordingly, radar bracket pipes need to have front portions whose length from the bulkhead along the vehicle front-rear direction depends on the vehicle. Thus, a vehicle with a long length from the bulkhead to the vehicle front end needs to have radar bracket pipes whose length along the vehicle front-rear direction is long in accordance with the length from the bulkhead to a position where the radar is disposed.

With such radar bracket pipes with a long length along the vehicle front-rear direction, a torsional force and/or a vibration force generated in the vehicle body may cause adverse effects on the operation of the radar device.

The present invention has been made keeping in mind the above-described problems occurring in the background art, and an object of the present invention is to provide a vehicle body front structure which is capable of reducing the torsional force or the like transmitted from a vehicle body to an object detection device even when a distance from a vehicle body member to the object detection device is large.

Solution to Problem

To solve the above-described problem, a vehicle body front structure according to an embodiment of the present invention has: an object detection device disposed in a vehicle front end section of a vehicle to detect an object ahead of the vehicle; and a pair of bracket members which are spaced apart from each other in a vehicle width direction and which support the object detection device. Each of the pair of bracket members includes: a forwardly extending portion that extends forward from a vehicle body member; and a downwardly extending portion that extends downward from the forwardly extending portion and supports the object detection device. The vehicle body front structure further has a bracket member locking member which couples the forwardly extending portions to each other in the vehicle width direction and to which an exterior member of the vehicle is attached.

Advantageous Effect of the Invention

According to the vehicle body front structure according to the present invention, a torsional force or the like transmitted from the vehicle body to the object detection device can be reduced even when a distance from the vehicle body member to the object detection device is large.

DETAILED DESCRIPTION OF EMBODIMENTS

A vehicle body front structure according to an embodiment of the present invention is described with reference to FIGS. 1 to 10.

As used herein, the terms "front" and "rear" respectively refer to the advancing and back directions of a vehicle C; the terms "up" and "down" respectively refer to the upward and downward directions in the vertical direction; and the terms "left" and "right" refer to the vehicle width direction.

Vehicle

Figure 1:
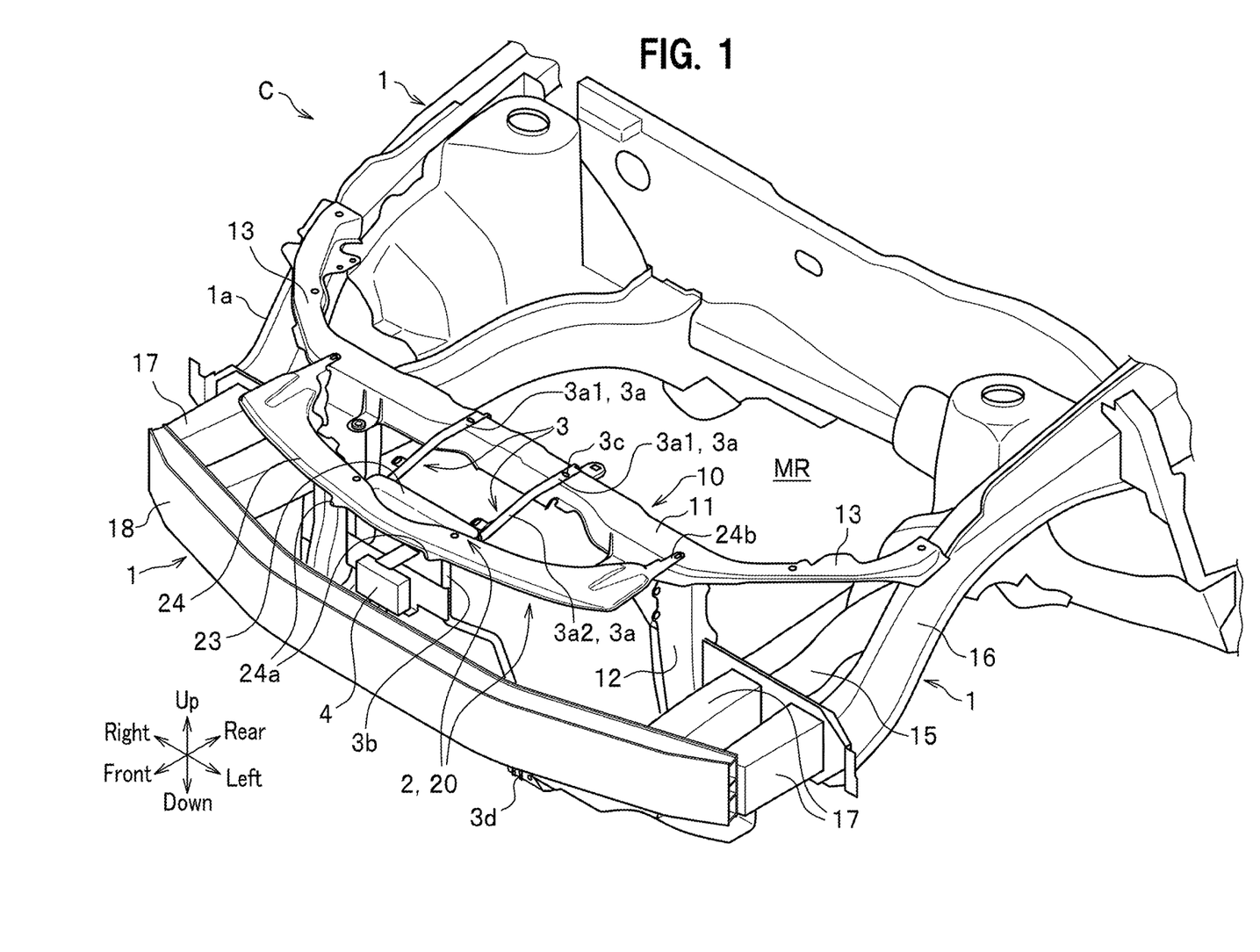
FIG. 1 is a perspective view schematically illustrating principal components of a vehicle body front structure according to an embodiment of the present invention, in a state where an engine hood or the like has been detached.

First, before describing a vehicle body front structure according to an embodiment of the present invention, a vehicle C to which the present invention is applied is described mainly with reference to FIG. 1.

The vehicle C is an automobile having a vehicle front end section 1a including a vehicle body member 1 forming a vehicle body, an exterior member 2 forming an exterior part of the vehicle C, an object detection device 4 that detects objects, and bracket members 3 for attaching the object detection device 4 to the vehicle body member 1. The form and type of the vehicle C is not particularly limited so long as the vehicle front end section 1a has the vehicle body member 1, the exterior member 2, the bracket members 3, and the object detection device 4. Examples of the vehicle C include passenger cars, buses, tracks, and service vehicles.

Hereinafter, an example of the present invention is described by exemplifying a passenger car having a motor room MR in a vehicle front end section 1a. It should be noted that the vehicle front end section 1a is substantially left-right symmetric and one of the left and right sides of the vehicle C is mainly described and description of the other side of the vehicle C is omitted as appropriate.

Vehicle Body Member

Figure 2:
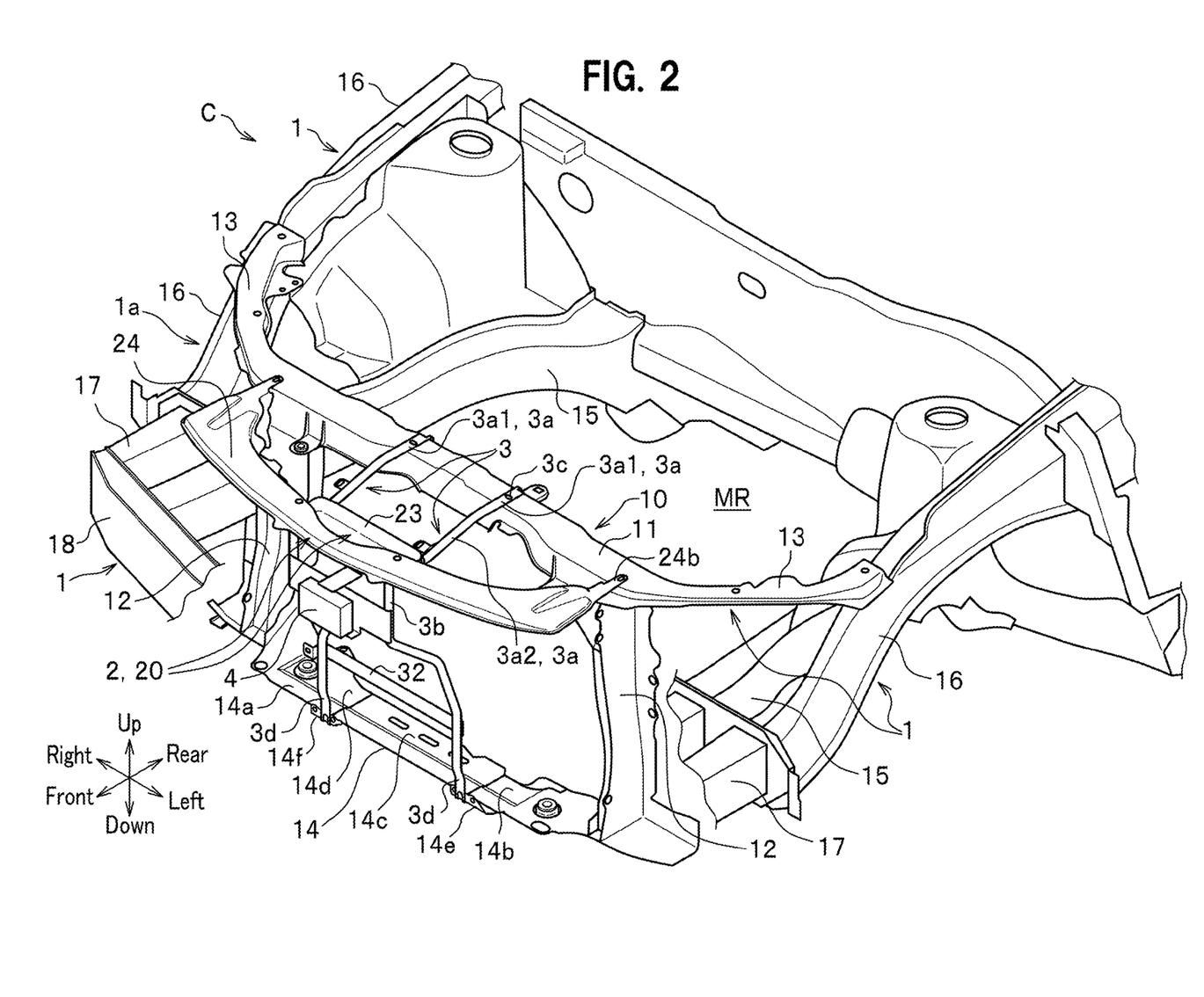
FIG. 2 is a perspective view schematically illustrating principal components of the vehicle body front structure illustrated in FIG. 1, in a state where a bumper beam and bumper extensions are partially illustrated.

As shown in FIG. 2, the vehicle body member 1 is made up of structural members of a vehicle body. The vehicle body member 1 has a vehicle front end section 1a including: bulkhead 10, front side frames 15, upper members 16, bumper beam extensions 17, a bumper beam 18, and a cushioning member 19.

Bulkhead

Figure 3:
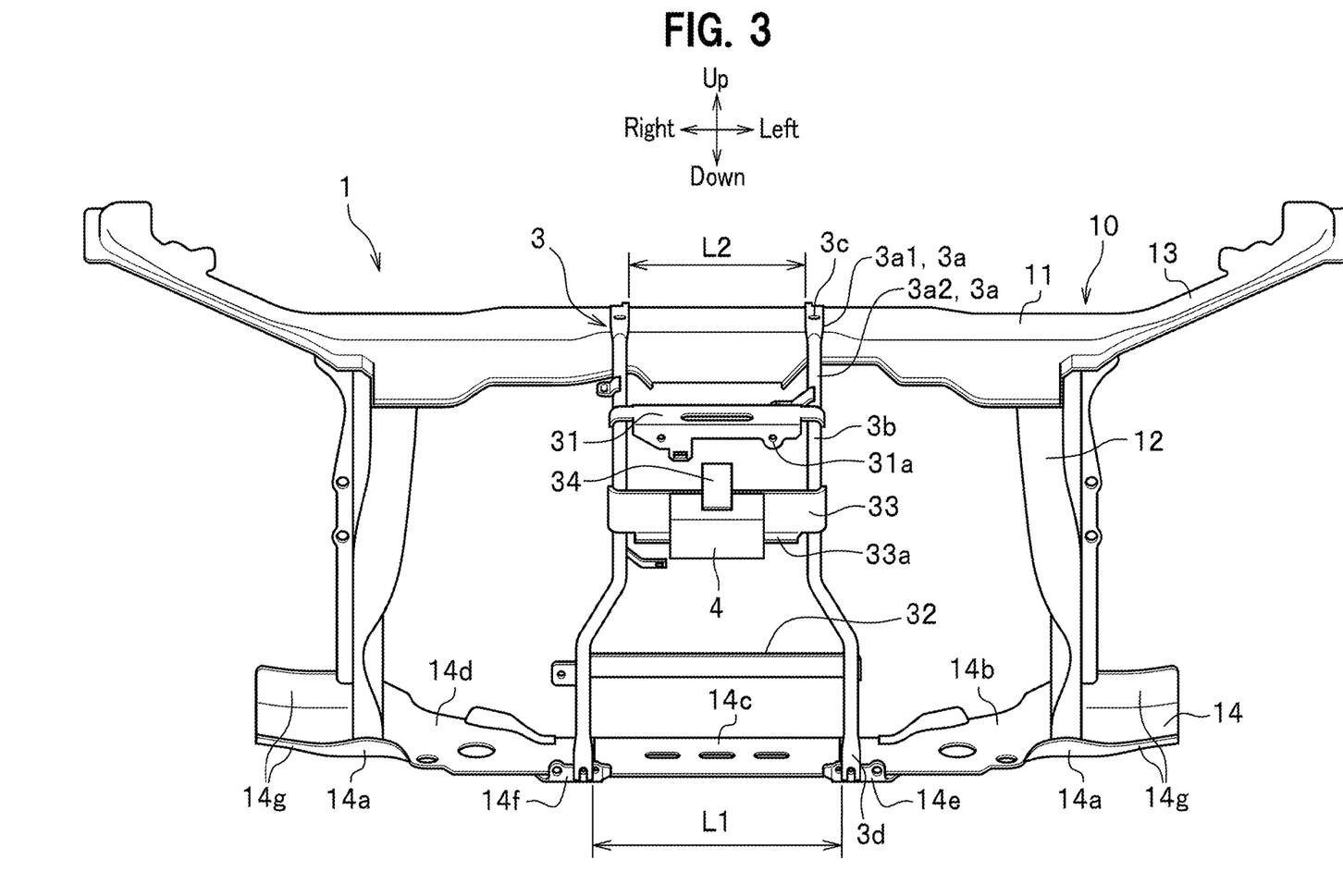
FIG. 3 is a perspective view schematically illustrating a bulkhead and bracket members as seen obliquely from above and from the front.

As shown in FIG. 3, the bulkhead 10 is a metal frame member formed in a substantially frame-like shape such as to surround an outer periphery of a radiator (illustration omitted). The bulkhead 10 is formed in a substantially quadrilateral shape by coupling an bulkhead upper 11, a pair of left and right bulkhead side stays 12, a pair of left and right bulkhead upper sides 13, and a bulkhead lower 14.

The bulkhead upper 11 is a frame member that constitutes an upper portion of the bulkhead 10. The bulkhead upper 11 is formed of a rectangular tubular member extending in a vehicle width direction (see FIG. 5).

The pair of left and right bulkhead side stays 12 is a pair of left and right frame members that respectively constitute left and right side portions of the bulkhead 10. The left bulkhead side stay 12 extends downward from a left end portion of the bulkhead upper 11 toward a left end portion of the bulkhead lower 14; and the right bulkhead side stay 12 extends downward from a right end portion of the bulkhead upper 11 toward a right end portion of the bulkhead lower 14.

The bulkhead upper sides 13 are each a frame member having an arc shape in plan view and extending respectively continuously from the left and right end portions of the bulkhead upper 11. Each of the bulkhead upper sides 13 has an outer end portion that extends rearward to be coupled to a central portion of corresponding one of the upper members 16 (see FIG. 2).

As shown in FIGS. 2 and 3, the bulkhead lower 14 is a frame member that constitutes a lower portion of the bulkhead 10. The bulkhead lower 14 is disposed below and in parallel with the bulkhead upper 11, so that the bulkhead lower 14 and bulkhead upper 11 oppose each other. The bulkhead lower 14 is made up of a plurality of plate-like members extending in the vehicle width direction. Specifically, a first plate-like member 14b, a second plate-like member 14c, and a third plate-like member 14d are juxtaposed on the bulkhead lower body 14a in the vehicle width direction in a single row and joined to the bulkhead lower body 14a to form the bulkhead lower 14.

The bulkhead lower body 14a is a flat plate member attached to and between the left and right bulkhead side stays 12 and has a substantially rectangular shape in plan view. The bulkhead lower body 14a has opposite ends located opposite each other in the vehicle width direction. The opposite ends each have a front end portion and a rear end portion at each of which a bent portion 14g for reinforcement is formed (see FIG. 3). The bulkhead lower body 14a has a central portion where stepped portions 14h for reinforcement are formed (see FIG. 8). A bulkhead bracket 14e (see FIGS. 7 and 8) is fastened to a lower end portion 3d of the left bracket member 3 and is joined to a forward portion of the first plate-like member 14b that is joined to the second plate-like member 14c. A bulkhead bracket 14f is fastened to a lower end portion 3d of the right bracket member 3 and is joined to a forward portion of the third plate-like member 14d that is joined to the second plate-like member 14c.

The first plate-like member 14b is a flat plate member having a substantially rectangular shape in plan view and disposed on a left portion of the bulkhead lower body 14a. The second plate-like member 14c is a flat plate member having a substantially rectangular shape in plan view and disposed on a central portion of the bulkhead lower body 14a. The third plate-like member 14d is a flat plate member having a substantially rectangular shape in plan view and disposed on a right portion of the bulkhead lower body 14a. The first plate-like member 14b, the second plate-like member 14c, and the third plate-like member 14d are joined to the bulkhead lower body 14a by spot welding or the like.

As shown in FIG. 1, the pair of left and right front side frames 15 is a pair of left and right structural frame members respectively extending from locations near left and right end portions of the bumper beam 18 rearward in the vehicle front-rear direction via a respective bumper beam extension 17.

The pair of left and right upper members 16 is a pair of left and right structural frame members respectively included in vehicle body side structures located on the left and right sides of the motor room MR. Each of the pair of left and right structural frame members extends from a front lower end portion of the respective vehicle body side structure to a rear upper end portion thereof. A front end portion of each of the pair of left and right upper members 16 is coupled to corresponding one of the bumper beam extensions 17, which are respectively attached to left and right end portions of the bumper beam 18.

As shown in FIG. 1, the bumper beam extensions 17 are metal cushioning members that collapse and buckle in the event of a collision of the vehicle C to absorb the collision load. The bumper beam extensions 17 are each a tubular member and are provided in sets of two respectively at vehicle width direction left and right end portions of the bumper beam 18. One of the two bumper beam extensions 17 is disposed between the bumper beam 18 and corresponding one of the pair of left and right front side frames 15. The other one of the two bumper beam extensions 17 is disposed between the bumper beam 18 and corresponding one of the pair of left and right upper members 16.

Figure 5:
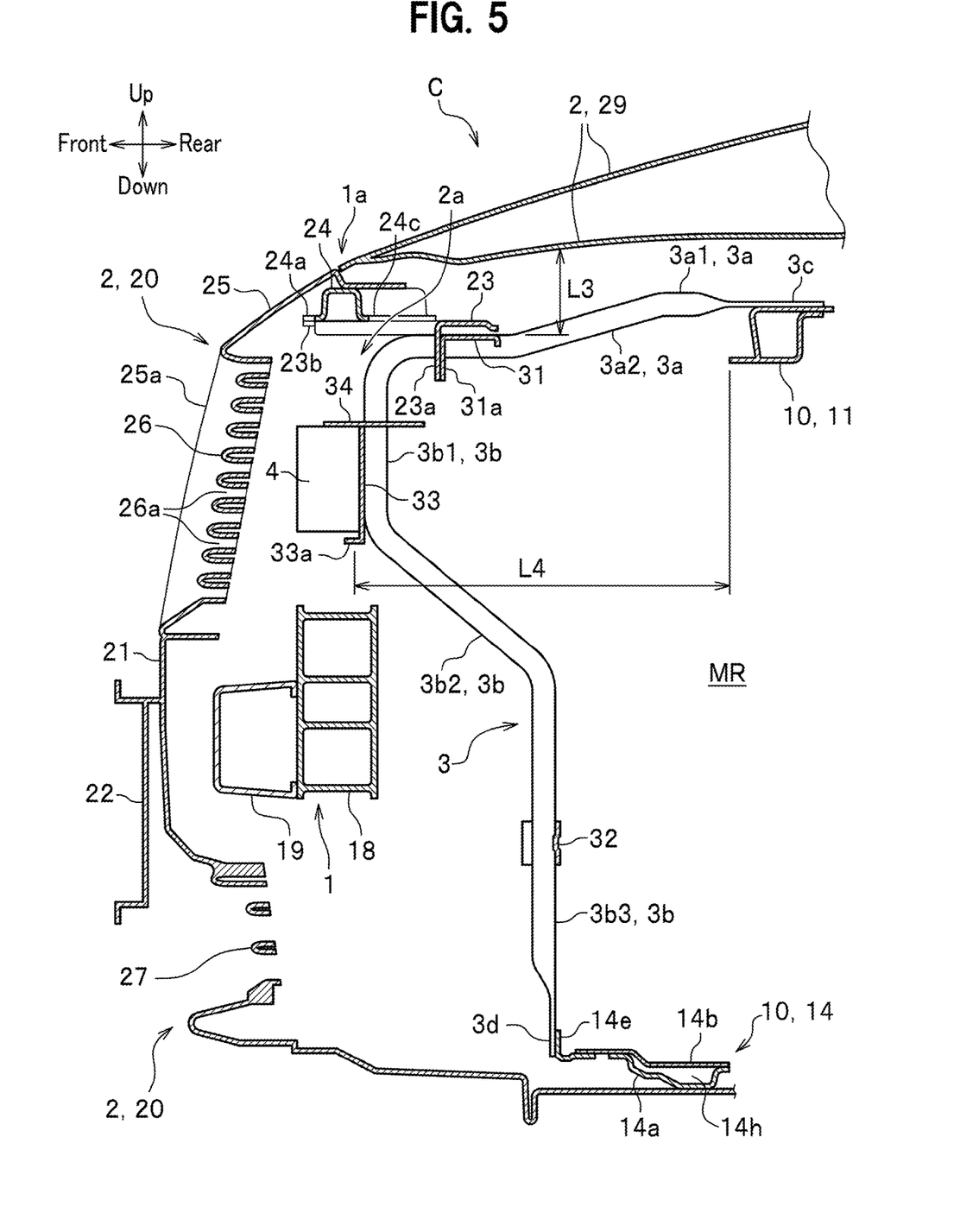
FIG. 5 is a cross sectional view schematically illustrating the vehicle front end section.

The bumper beam 18 is a structural member extending in the vehicle width direction. As shown in FIG. 5, the bumper beam 18 is formed of a steel member having a vertically elongated rectangular cross section in vertical cross-sectional view. Attached on a front surface of the bumper beam 18 is the cushioning member 19 extending in the vehicle width direction. A front bumper 21 is fixed on the front side of the bumper beam 18.

Exterior Member

As shown in FIG. 5, the exterior member 2 has a member located in a front portion of the vehicle front end section 1*a* and a member located in an upper portion of the vehicle front end section 1*a*. The exterior member 2 is mainly constituted by a front member 20 and an engine hood 29. The front member 20 forms the front portion of the vehicle front end section 1*a*. The engine hood 29 forms the upper portion of the vehicle front end section 1*a*.

The front member 20 is constructed by integrally connecting the front bumper 21, a number plate attachment portion 22, a bumper support member 23, a bumper locking member 24, a hood edge 25, left and right connection portions 25*a*, wind guiding plates 26, and a radiator under grille 27, which are described later. Of these, the front bumper 21, the number plate attachment portion 22, the hood edge 25, the left and right connection portions 25*a*, the wind guiding plates 26, and the radiator under grille 27 are integrally formed of a plastic.

The front bumper 21 is a plastic bumper face disposed on the front side of the cushioning member 19 with a gap therebetween. The front bumper 21 extends in the vehicle width direction along the bumper beam 18. Formed on a front surface central portion of the front bumper 21 is the number plate attachment portion 22. The hood edge 25 is located above the front bumper 21 with the wind guiding plates 26 in between. The radiator under grille 27 is located below the front bumper 21.

Figure 6:
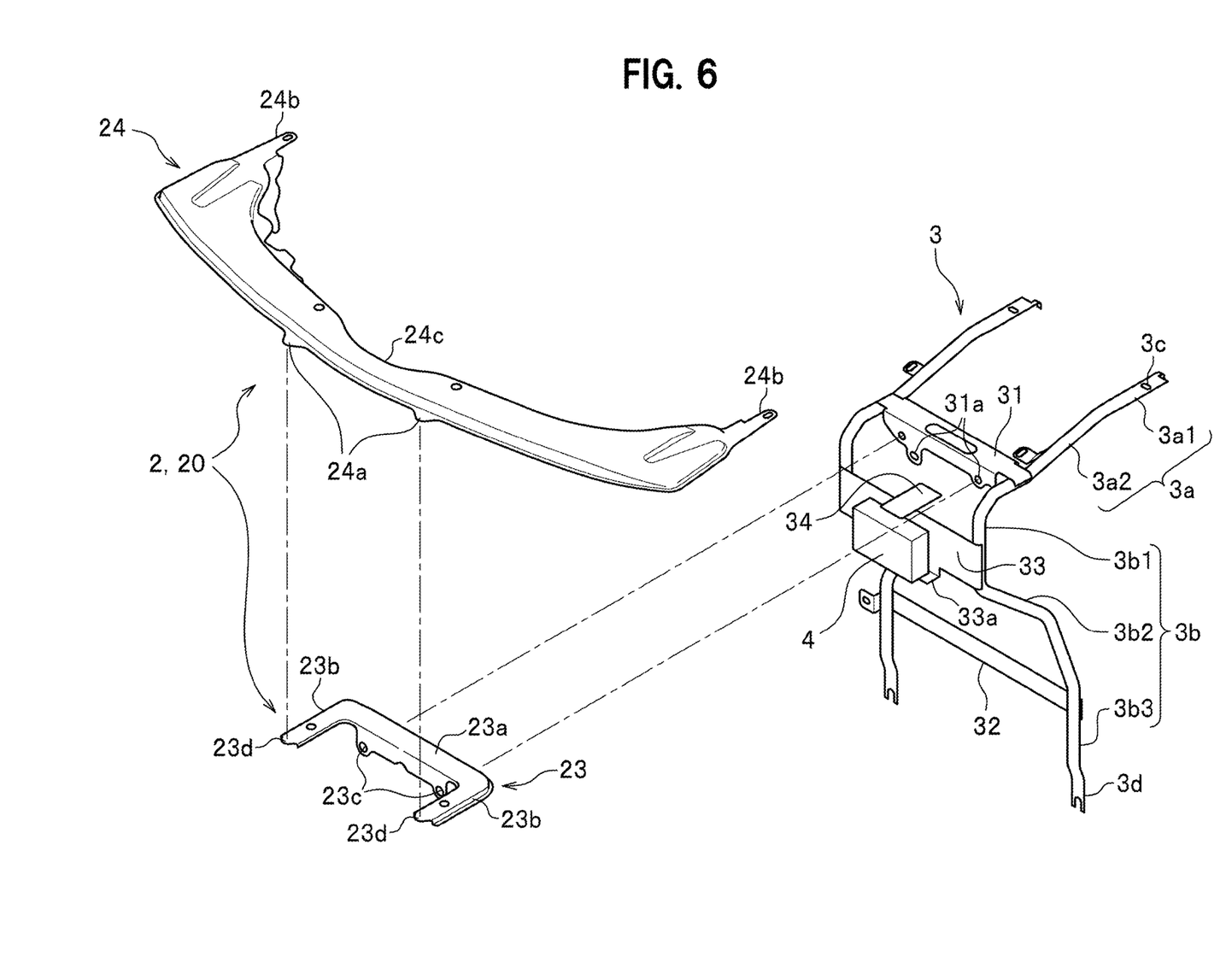
FIG. 6 is a perspective view schematically illustrating the bracket members and a bumper support member.
Figure 7:
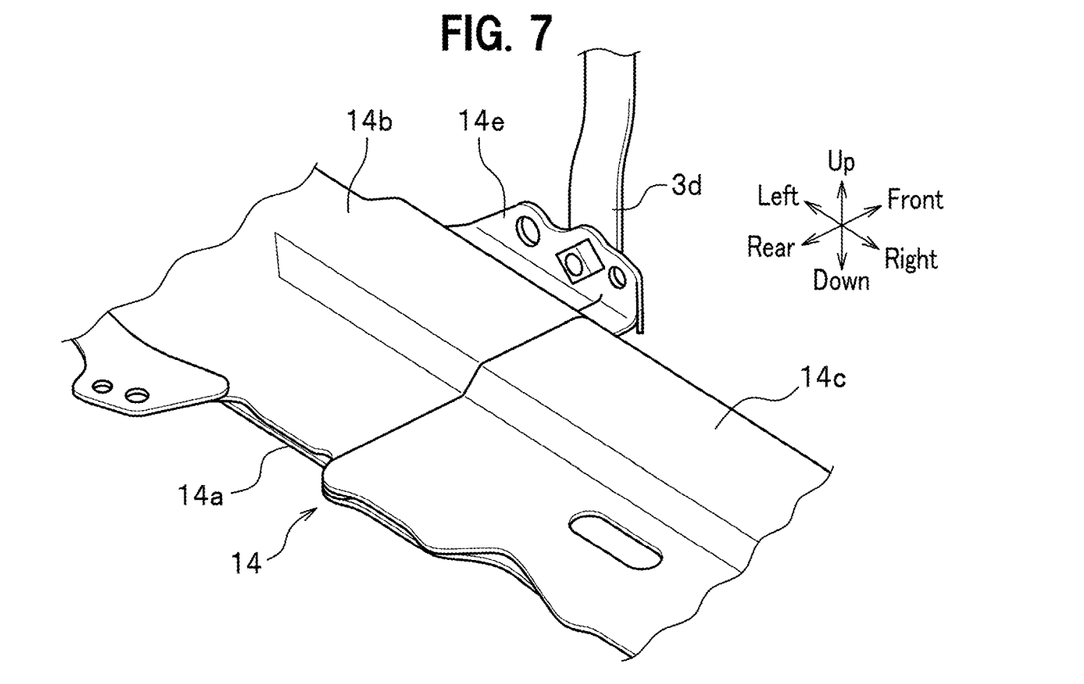
FIG. 7 is an enlarged perspective view schematically illustrating the rear side of main components of a connection section where the bracket member is coupled to a bulkhead lower, as seen obliquely from above.
Figure 8:
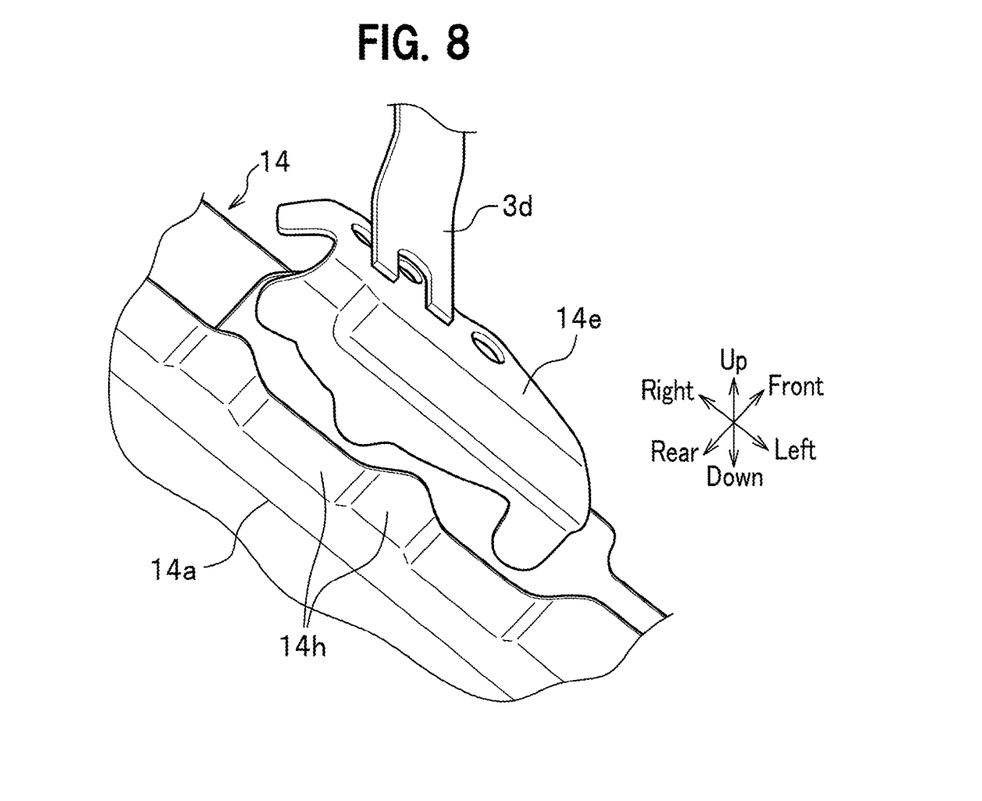
FIG. 8 is an enlarged perspective view schematically illustrating the front side of the main components of the connection section where the bracket member is coupled to the bulkhead lower, as seen obliquely from below.
Figure 9:
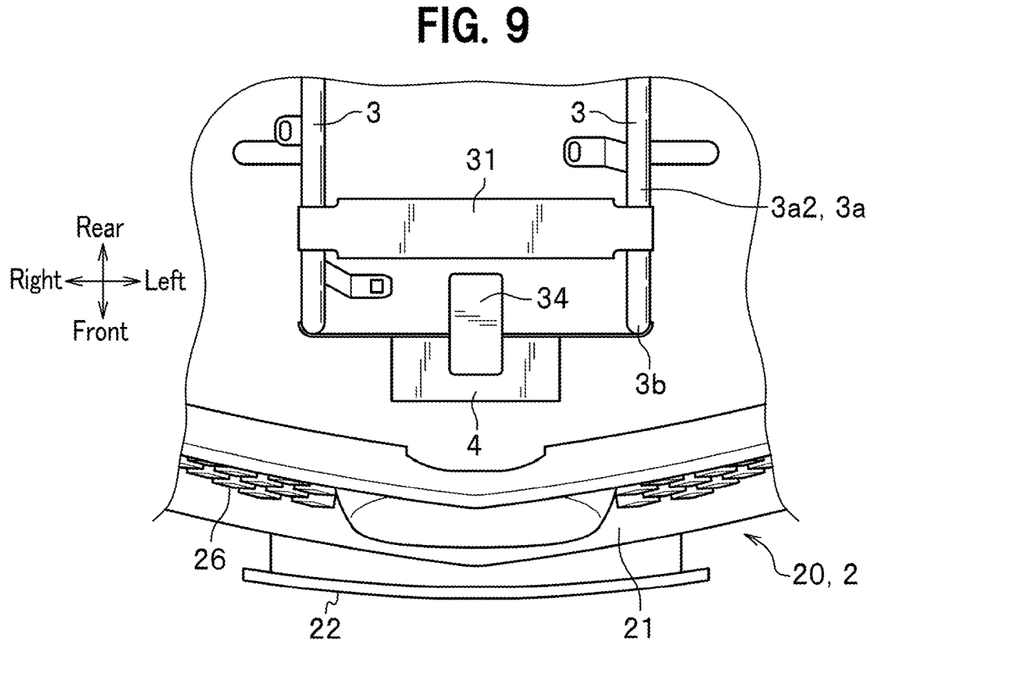
FIG. 9 is an enlarged plan view schematically illustrating how an object detection device is attached in the vehicle body front structure.

As shown in FIG. 6, the bumper support member 23 couples a bracket member locking member 31 attached to and between the two bracket members 3 to the bumper locking member 24 fixed to the hood edge 25. The bumper support member 23 is a metal plate bracket formed in a substantially C shape in plan view. The bumper support member 23 includes: a left-right direction extending portion 23*a* extending in the vehicle width direction; a pair of left and right forwardly extending portions 23*b* respectively extending forward from opposite end portions of the left-right direction extending portion 23*a*; a pair of left and right first coupling portions 23*c* formed on the left-right direction extending portion 23*a*; and a pair of left and right second coupling portions 23*d* respectively formed on the pair of left and right forwardly extending portions 23*b*.

As shown in FIG. 5, the bumper support member 23 is coupled via the bumper locking member 24 to the hood edge 25. Thus, the bumper support member 23 supports the front member 20 via the bumper locking member 24. In other words, the bumper support member 23 supports the front bumper 21 via the bumper locking member 24, the hood edge 25, and the left and right connection portions 25*a*.

As shown in FIG. 6, the pair of left and right first coupling portions 23*c* is coupled to a pair of left and right bumper support member attachment portions 31*a* of the bracket member locking member 31 in a vehicle front-rear direction. The pair of left and right second coupling portions 23*d* are respectively coupled to two protruding portions 24*a* of the bumper locking member 24 that are formed on a front side thereof, in an up-down direction. It should be noted that the pair of left and right first coupling portions 23*c* may be coupled to the left and right bumper support member attachment portions 31*a* in the up-down direction.

The bumper locking member 24 is a metal frame member fixed to the bumper support member 23 and extending in the vehicle width direction. The bumper locking member 24 includes: the two protruding portions 24*a*, which are respectively formed to protrude forward at two left and right front portions of the bumper locking member 24 that are located near the center thereof; left and right bulkhead coupling pieces 24*b* respectively extending rearward from left and right end portions of the bumper locking member 24; and a concave portion 24*c* formed at a rear end portion of a vehicle width direction central portion of the bumper locking member 24. The vehicle width direction central portion of the bumper locking member 24 is fixed to the bumper support member 23 in a state where the protruding portions 24*a* are placed on the pair of left and right second coupling portions 23*d* of the bumper support member 23.

Figure 4:
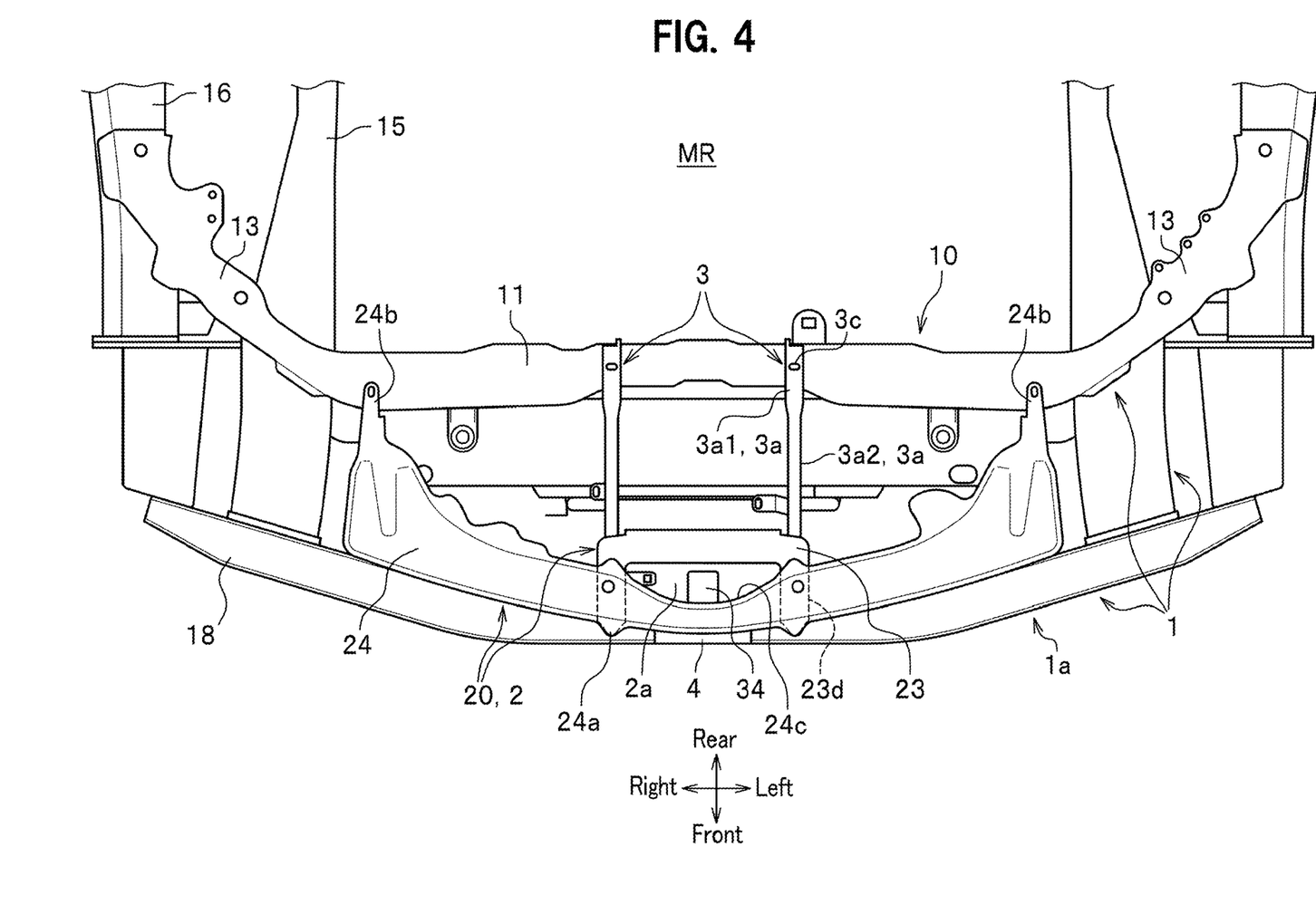
FIG. 4 is a plan view schematically illustrating a vehicle front end section from which the engine hood and the like have been detached.

As shown in FIG. 5, the left and right end portions of the bumper locking member 24 is fixed to the bulkhead upper 11 in a state where the left and right bulkhead coupling pieces 24*b* are placed on the bulkhead upper 11 (see FIG. 4). The bumper support member 23 and the bumper locking member 24 together define, above an object detection device 4, an open space 2*a* with an opening through which operations for calibrating the object detection device 4 can be carried out. As the concave portion 24*c* of the bumper locking member 24 is curved inwardly (see FIG. 10), the opening of the open space 2*a* has an increased area.

The hood edge 25 is a plate-like portion of a later-described engine hood 29, wherein the plate-like portion extends in the vehicle width direction at a central portion of the engine hood 29 on the front side thereof along a front end of the engine hood 29. The hood edge 25 has left and right end portions from which the plate-like, left and right connection portions 25*a* respectively continuously extend to the front bumper 21 located below. The hood edge 25 and the left and right connection portions 25*a* are formed to have an inverted U shape so as to frame left and right end portions and an upper portion of the plurality of wind guiding plates 26, which extend in the vehicle width direction. In other words, the hood edge 25 and the left and right connection portions 25*a* are formed to have an inverted U shape extending upward from an upper portion of the front bumper 21.

The plurality of wind guiding plates 26 are members for taking air into the vehicle front end section 1*a* to guide the air to a radiator (not shown.)

The plurality of wind guiding plates 26 are each a substantially plate-like member extending in the vehicle width direction and are disposed at appropriate intervals in an up-down direction. The object detection device 4 is disposed rearwardly of the plurality of wind guiding plates 26 with a space therebetween. As a result, the object detection device 4 is disposed so as to be able to detect objects ahead of the vehicle through external air intake ports 26*a*, each defined between each adjacent two of the plurality of wind guiding plates 26.

The radiator under grille 27 is formed of plate-like members for defining air intake ports for intaking air to be guided to the radiator (not shown), like the plurality of wind guiding plates 26. The wind having entered vehicle front end section 1*a* through the gaps defined by the radiator under grille 27 and the plurality of wind guiding plates 26 reaches the radiator (illustration omitted) without being blocked.

The engine hood 29 is an opening and closing body that covers over the motor room MR (engine room) in an openable and closable manner. Located below a front end portion of the engine hood 29 are the bumper support member 23, the bumper locking member 24, and upper end portions 3*c* and slanted portions 3*a*2 of the pair of left and right bracket members 3.

Bracket Member

As shown in FIGS. 5 and 6, the pair of left and right bracket members 3 fixes the object detection device 4 to the vehicle body member 1 (bulkhead 10). The pair of left and right bracket members 3 is a pair of left and right pipe-like members extending in the forward direction from the vehicle body member 1 (bulkhead 10) and spaced apart from each other in the vehicle width direction so as to be located on the left and right sides of the object detection device 4. The upper end portion 3c and the lower end portion 3d of each of the pair of left and right bracket members 3 are respectively fixed to the bulkhead upper 11 and the bulkhead lower 14. Each of the pair of left and right bracket members 3 includes, from an upper end to a lower end: the upper end portion 3c, a forwardly extending portion 3a, a downwardly extending portion 3b, and the lower end portion 3d. The forwardly extending portion 3a includes a horizontally extending portion 3a1 and the slanted portion 3a2. The downwardly extending portion 3b includes an upper downwardly extending portion 3b1, a lower slanted portion 3b2, and a lower downwardly extending portion 3b3. The bracket member locking member 31, a bracket bridging member 33, a downwardly extending portion locking member 32 are each attached to and between the pair of left and right bracket members 3.

The pair of left and right bracket members 3 may be configured to support the object detection device 4 from left and right sides thereof or to support a central portion or left and right end portions of the object detection device 4 from upper and lower sides thereof.

As shown in FIG. 3, the pair of left and right bracket members 3 is formed in a curved shape by bending work so that, as viewed from the front, a spaced-apart distance L1 between lower portions of the downwardly extending portions 3b along the vehicle width direction is longer than a spaced-apart distance L2 between the forwardly extending portions 3a along the vehicle width direction.

As shown in FIG. 5, the upper end portion 3c is placed on the bulkhead upper 11 and fastened thereto by a bolt.

The forwardly extending portion 3a extends forward from the upper end portion 3c, which is fixed to the bulkhead upper 11 (vehicle body member 1), to the downwardly extending portion 3b. The horizontally extending portion 3a1 extends substantially horizontally from the upper end portion 3c. The slanted portion 3a2 is slanted downward from a front end portion of the horizontally extending portion 3a1 in side view.

Due to the presence of the slanted portion 3a2, a vertical spaced-apart distance L3 between the engine hood 29 and the bracket member 3 is increased.

The downwardly extending portion 3b serves as a place to dispose the bracket bridging member 33 that supports the object detection device 4. The downwardly extending portion 3b extends downward from a front end of the forwardly extending portion 3a. The downwardly extending portion 3b is the most anterior portion of the bracket member 3.

The upper downwardly extending portion 3b1 extends vertically downward from the front end of the forwardly extending portion 3a. The lower slanted portion 3b2 extends obliquely rearward and downward from a lower end of the upper downwardly extending portion 3b1. The lower downwardly extending portion 3b3 extends downward from a lower end of the lower slanted portion 3b2 toward the lower end portion 3d. The lower end portion 3d is fastened to the bulkhead bracket 14e or 14f of the bulkhead lower 14 by a bolt.

As shown in FIG. 6, the bracket member locking member 31 couples between the forwardly extending portions 3a in the vehicle width direction. The bracket member locking member 31 is a metal plate member that is formed to have an inverted L-shape in vertical cross-sectional view by bending, and includes: a horizontal plate portion extending horizontally; and a vertical plate portion extending downward from a front end of the horizontal plate portion. The bracket member locking member 31 has integrally formed left and right bumper support member attachment portions 31a to which the bumper support member 23 is fastened by bolts. The bumper support member 23 is coupled to the bumper locking member 24, which is a member of the exterior member 2 of the vehicle C.

The left and right bumper support member attachment portions 31a are a pair of left and right protruding pieces protruding downward from the vertical plate portion of the bracket member locking member 31.

The downwardly extending portion locking member 32 is a plate-like member that couples between lower portions (lower downwardly extending portions 3b3) of the downwardly extending portions 3b of the pair of left and right bracket members 3, in the vehicle width direction.

The bracket bridging member 33 is a metal plate member for fixing the object detection device 4. The bracket bridging member 33 couples between the upper downwardly extending portions 3b1 of the pair of left and right bracket members 3 in the vehicle width direction. Formed at a central lower end of the vertically arranged bracket bridging member 33 is an object detection device placement piece 33a. The object detection device placement piece 33a is formed by bending a lower end central portion of the bracket bridging member 33 so as to protrude horizontally forward. A position adjustment bracket 34 is joined to an upper-end central portion of the bracket bridging member 33. The object detection device 4 is placed and held on the object detection device placement piece 33a.

Figure 10:
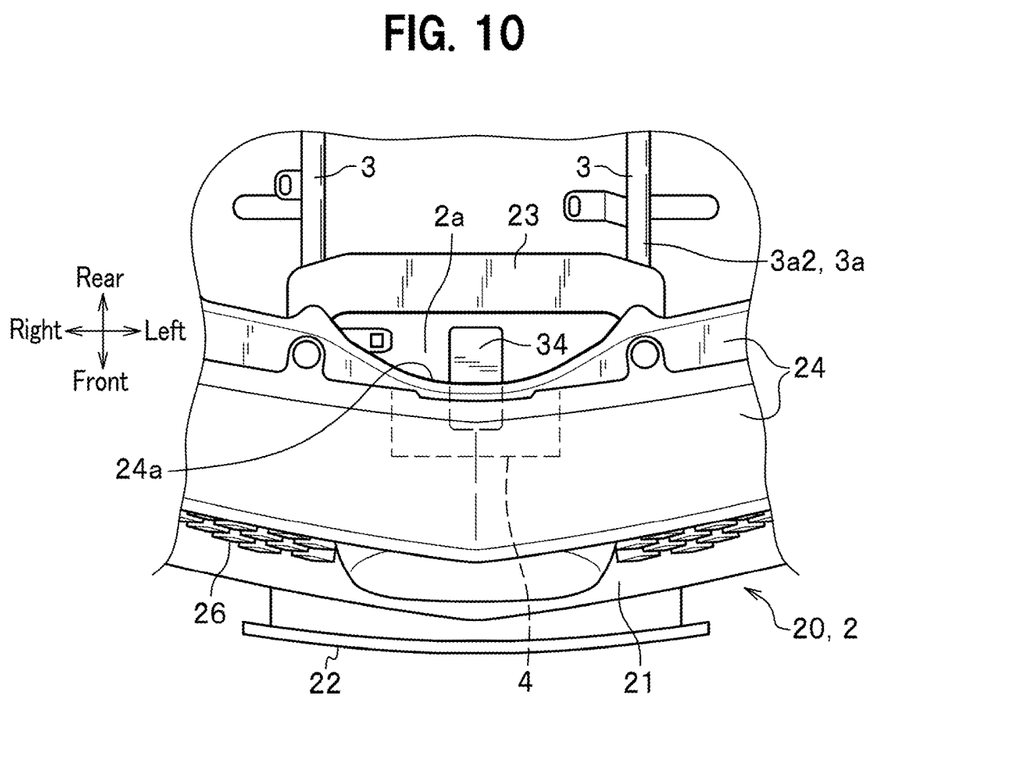
FIG. 10 is an enlarged plan view schematically illustrating how a position adjustment bracket is arranged in the vehicle body front structure.

The position adjustment bracket 34 supports the object detection device 4 from an upper side thereof. The position adjustment bracket 34 is a metal plate member extending horizontally from the upper end central portion of the bracket bridging member 33 in the front-rear direction.

Object Detection Device

The object detection device 4 is arranged in the vehicle front end section 1a to detect objects ahead of the vehicle. Examples of the object detection device 4 include: radars such as millimeter wave radars and laser radars; sensors such as ultrasound sonars and optical sensors; and cameras such as monocular cameras and infrared cameras. Hereinafter, a description will be given of the object detection device 4, taking a millimeter wave radar as an example.

The object detection device 4 (millimeter wave radar) has: a transmission antenna that transmits millimeter waves; and a reception antenna that receives millimeter waves that has reflected by an object ahead of the vehicle and returned.

Operation of Vehicle Body Front Structure

Next, a description will be given of operations of the vehicle body front structure according to the embodiment of the present invention with reference to FIGS. 1 to 10.

As shown in FIG. 5, the object detection device 4 emits millimeter waves in the forward direction of the vehicle via the external air intake ports 26a of the wind guiding plates 26 located in front of the object detection device 4. When the millimeter waves are reflected by an object ahead of the vehicle and received by the reception antenna, the approaching of the vehicle to the object can be detected.

As shown in FIG. 3, the pair of left and right bracket members 3 is firmly coupled with each other because they are coupled by the bracket member locking member 31, bracket bridging member 33, and the downwardly extending portion locking member 32. The upper end portions 3c of the pair of left and right bracket members 3 are fixed to the bulkhead upper 11, and the lower end portions 3d of the pair of left and right bracket members 3 are fixed to the bulkhead lower 14. Thus, the pair of left and right bracket members 3 is fixed to the bulkhead 10. The object detection device 4 is firmly fixed because it is attached to the pair of left and right bracket members 3.

As shown in FIG. 5, a vehicle body front structure according to an embodiment of the present invention has: an object detection device 4 disposed in a vehicle front end section 1a of a vehicle to detect an object ahead of the vehicle; and a pair of bracket members 3 which are spaced apart from each other in a vehicle width direction and which support the object detection device 4. Each of the pair of bracket members 3 includes: a forwardly extending portion 3a extending forward from a vehicle body member 1; and an downwardly extending portion 3b that extends downward from the forwardly extending portion 3a and supports the object detection device 4. The vehicle body front structure further has a bracket member locking member 31 via which the forwardly extending portions 3a are coupled to each other in the vehicle width direction and to which an exterior member 2 of the vehicle C is attached.

With this structure, as the pair of bracket members 3, which support the object detection device 4, are coupled to each other by the bracket member locking member 31 in the vehicle width direction as shown in FIG. 6, the bracket attachment force is improved. Thus, a torsional force or the like transmitted from the vehicle body via the pair of left and right bracket members 3 to the object detection device 4 can be reduced even when a distance L4 from the vehicle body member 1 to the object detection device 4 is large as shown in FIG. 5. In addition, the bracket member locking member 31 is supported by the exterior member 2 of the vehicle C due to the attachment of the bracket member locking member 31 to the exterior member 2. Thus, the strength of the pair of left and right bracket members 3 against up-down vibrations of the vehicle body can be increased.

As shown in FIGS. 2 and 3, the vehicle body member 1 includes a bulkhead 10 with a bulkhead lower 14 located at a lower portion of the bulkhead 10 and made up of a plurality of plate-like members extending in the vehicle width direction, and a lower end portion 3d of each of the pair of bracket members 3 is attached to a portion of the bulkhead lower 14 where at least two of the plurality of plate-like members are stacked with one another.

With this structure of the vehicle body member 1, as the lower end portion 3d of each of the pair of left and right bracket members 3 is fixed to a portion of the bulkhead lower 14 which is strengthened by stacking the at least two of the plurality of plate-like members, a torsional force or the like transmitted to the object detection device 4 can be reduced.

As shown in FIGS. 5 and 6, the exterior member 2 has: a bumper support member 23 which is attached to the pair of bracket members 3 and which supports a front bumper 21; and a bumper locking member 24 fixed on the bumper support member 23 and extending in the vehicle width direction. The bumper locking member 24 has protruding portions 24a protruding forward and fixed to the bumper support member 23.

With this structure, the bumper locking member 24 is fixed to the bumper support member 23 supported by the vehicle body member 1 via the pair of bracket members 3, by fixing the forwardly protruding portions 24a to the bumper support member 23. Thus, when a front bumper 21 of the exterior member 2 is assembled to the bumper locking member 24, the front bumper 21 can be prevented from being lowered, for example, due to a load applied from above. As a result, the pair of bracket members 3 is prevented from being deformed due to a load applied to the front bumper 21.

As shown in FIGS. 4 and 5, the exterior member 2 has: the bumper support member 23, which is attached to the pair of left and right bracket members 3 and which supports the front bumper 21; and the bumper locking member 24 fixed on the bumper support member 23 and extending in the vehicle width direction. The bumper support member 23 and the bumper locking member 24 together define, above the object detection device 4, an open space 2a with an opening.

As the bumper support member 23 and the bumper locking member 24 together define, above the object detection device 4, the open space 2a with an opening, an operator can insert his/her hand into the open space 2a to carry out operations. Accordingly, the operator can easily carry out operations such as adjusting the installation position and/or the axis of the object detection device 4.

As shown in FIGS. 5 and 6, the forwardly extending portion 3a of each of the pair of bracket members 3 includes a slanted portion 3a2 that is slanted downward in side view.

With this structure, as shown in FIG. 5, as the pair of left and right bracket members 3 each have the slanted portion 3a2 slanted downward, a vertical spaced-apart distance L3 between an engine hood 29 and the pair of left and right bracket members 3 is increased. As a result, when a walker comes in contact with the engine hood 29, a collision stroke is ensured and the cushioning of the engine hood 29 is improved.

As shown in FIG. 3, the bracket members 3 are structured such that a vehicle width direction spaced-apart distance L1 between lower portions of the downwardly extending portions 3b is longer than a vehicle width direction spaced-apart distance L2 between the forwardly extending portions 3a. In addition, the vehicle body front structure further has an downwardly extending portion locking member 32 that couples between the lower portions of the downwardly extending portions 3b in the vehicle width direction.

With this structure, because the spaced-apart distance L1 between the lower portions of the pair of left and right bracket members 3 along the vehicle width direction is large, the support span is increased and thus the support strength is increased. Thus, the pair of bracket members 3 has an increased strength against the weight of the exterior member 2 and/or the torsional force or the like of the vehicle body. In addition, because the lower portions of the downwardly extending portions 3b are coupled with each other in the vehicle width direction, the strength of the pair of bracket members 3 is further increased.

MODIFICATIONS

It should be noted that the present invention is not limited to the above-described embodiments and various modifications and alternations can be made without departing from the spirit and scope of the present invention. It is obvious that such modifications and alternations are included in the present invention.

In the above described embodiment, the vehicle body member 1 has been described as being constructed of rectangular tubular frames and frame members with a substantially C shaped cross section. However, the vehicle body member 1 may be constructed of tubular members having another shape such as a circular cylindrical shape. In addition, the vehicle body member 1 can be made of any material as long as the material has high rigidity.

What is claimed is:

1. A vehicle body front structure comprising:
   an object detection device disposed in a vehicle front end section of a vehicle to detect an object ahead of the vehicle; and
   a pair of bracket members which are spaced apart from each other in a vehicle width direction and which support the object detection device,
   wherein each of the pair of bracket members includes: a forwardly extending portion that extends forward from a vehicle body member; and a downwardly extending portion that extends downward from the forwardly extending portion and supports the object detection device, and
   wherein the vehicle body front structure further has a bracket member locking member which couples the forwardly extending portions to each other in the vehicle width direction and to which an exterior member of the vehicle is attached.

2. The vehicle body front structure according to claim 1, wherein the vehicle body member comprises a bulkhead,
   wherein the bulkhead comprises a bulkhead lower located at a lower portion of the bulkhead and made up of a plurality of plate-like members extending in the vehicle width direction, and
   wherein each of the pair of left and right bracket members has a lower end portion attached to a portion of the bulkhead lower where at least two of the plurality of plate-like members are stacked with one another.

3. The vehicle body front structure according to claim 1, wherein the exterior member comprises:
   a bumper support member attached to the pair of left and right bracket members to support a front bumper; and
   a bumper locking member fixed on the bumper support member and extending in the vehicle width direction, and
   wherein the bumper locking member has a protruding portion protruding forward and fixed to the bumper support member.

4. The vehicle body front structure according to claim 1, wherein the exterior member comprises:
   a bumper support member attached to the pair of left and right bracket members to support a front bumper; and
   a bumper locking member fixed on the bumper support member and extending in the vehicle width direction, and
   wherein the bumper support member and the bumper locking member together define, above the object detection device, an open space with an opening.

5. The vehicle body front structure according to claim 1, wherein the forwardly extending portion of each of the pair of bracket members includes a slanted portion slanted downward in side view.

6. The vehicle body front structure according to claim 1, wherein the pair of bracket members are structured such that a vehicle width direction spaced-apart distance between lower portions of the downwardly extending portions is longer than a vehicle width direction spaced-apart distance between the forwardly extending portions, and
   wherein the vehicle body front structure further comprises a downwardly extending portion locking member that couples between the lower portions of the downwardly extending portions in the vehicle width direction.

* * * * *